US008856434B2

(12) United States Patent  
Li et al.

(10) Patent No.: US 8,856,434 B2  
(45) Date of Patent: Oct. 7, 2014

(54) MEMORY SYSTEM AND METHOD

(75) Inventors: Jun Li, Fremont, CA (US); Gabriel Li, San Francisco, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 687 days.

(21) Appl. No.: 12/819,794

(22) Filed: Jun. 21, 2010

(65) Prior Publication Data

US 2011/0252162 A1    Oct. 13, 2011

Related U.S. Application Data

(63) Continuation-in-part of application No. 12/239,532, filed on Sep. 26, 2008, now Pat. No. 8,095,747.

(51) Int. Cl.  
    *G06F 12/00*     (2006.01)  
    *G06F 13/16*     (2006.01)  
    *G06F 13/28*     (2006.01)

(52) U.S. Cl.  
    CPC ............ *G06F 13/28* (2013.01); *G06F 13/1684* (2013.01)  
    USPC ....................................................... 711/105

(58) Field of Classification Search  
    None  
    See application file for complete search history.

(56) References Cited

U.S. PATENT DOCUMENTS

| | | | | |
|---|---|---|---|---|
| 6,625,687 | B1 * | 9/2003 | Halbert et al. | 711/105 |
| 7,013,359 | B1 | 3/2006 | Li | |
| 8,095,747 | B2 * | 1/2012 | Barbara et al. | 711/154 |
| 2004/0054845 | A1 * | 3/2004 | Ware et al. | 711/100 |
| 2005/0099384 | A1 * | 5/2005 | Wu et al. | 345/156 |
| 2007/0070669 | A1 | 3/2007 | Tsern | |
| 2007/0255919 | A1 | 11/2007 | Ware et al. | |
| 2008/0028126 | A1 * | 1/2008 | Bartley et al. | 711/100 |
| 2008/0028176 | A1 | 1/2008 | Bartley et al. | |
| 2009/0164677 | A1 | 6/2009 | Ware et al. | |

FOREIGN PATENT DOCUMENTS

CN     1926632 A     3/2007

OTHER PUBLICATIONS

International Search Report for International Application No. PCT/US08/86695 dated Feb. 6, 2009; 2 pages.  
Rami Marwan Nasr, "FBSIM and the Fully Buffered DIMM Memory System Architecture," University of Maryland, 2005, 138 pages.  
SIPO 1st Office Action for Application No. 200910178988 dated Jun. 6, 2013; 5 pages.  
USPTO Non Final Rejection for U.S. Appl. No. 12/239,532 dated Jul. 5, 2011; 8 pages.  
USPTO Notice of Allowance for U.S. Appl. No. 12/239,532 dated Oct. 19, 2011; 5 pages.  
Written Opinion of the International Searching Authority for International Application No. PCT/US08/86695 dated Feb. 6, 2009; 7 pages.  
SIPO Office Action for Application No. 200910178988 dated Feb. 17, 2013; 5 pages.  
TIPO Office Action for Application No. 97149679.0 dated Jan. 22, 2014; 4 pages.

* cited by examiner

*Primary Examiner* — Brian Peugh

(57) ABSTRACT

In an embodiment, an apparatus includes a memory controller configured to control a plurality of daisy chained memory components connected over a daisy chained bus. The daisy chained bus includes a direct connection from the transmit interface of the memory controller to a receive interface of an initial memory component, and a daisy chain connection from a transmit interface of the initial memory component to a receive interface of a next memory component. A bus extends from a transmit interface of a last memory component directly to a receive interface of the memory controller.

20 Claims, 7 Drawing Sheets

MEMORY SYSTEM AND METHOD

CROSS REFERENCE TO RELATED APPLICATIONS

The present application is a continuation-in-part of U.S. patent application Ser. No. 12/239,532, now U.S. Pat. No. 8,095,747, filed on Sep. 26, 2008, which is hereby incorporated by reference in its entirety.

TECHNICAL FIELD

The present disclosure relates generally to the field of memory systems.

BACKGROUND

A memory system includes a memory controller connected to one or more memory components via an address/command bus and a data bus. The memory controller sends commands over the address/command bus to control which memory component writes to and/or reads from a memory space represented by data stored on the memory components. Data to be written to one of the memory components is transferred from the memory controller to a corresponding one of the memory components over the data bus, while memory to be read is transferred from a corresponding one of the memory components over the data bus to the memory controller.

Some existing memory architectures use multi-drop connections from the memory controller to the memory components. A multi-drop connection includes a trace from the memory component that branches to the memory components. This branching of the trace creates signal reflections, which frustrates high frequency operation and accordingly limits throughput between the memory controller and the memory components.

Other issues of existing memory architectures are related to capacity. The storage capacity of a memory system is limited by many factors, including the system's word width. A word is typically equal to the bit width of the data bus extending from the memory controller.

Although extending word width can lead to larger capacities, e.g. a sixty four bit system can generally have greater memory capacity than a thirty two bit system, there are many tradeoffs. As word width is increased, routing the widened data buses becomes increasingly difficult. The complex data bus routing can result in data misalignment, where bits on each link of the data bus arrive at a component at different times. This data misalignment further frustrates high frequency operation, which again affects throughput between the memory controller and the memory components. Another tradeoff for increasing word width is the increased pin count, which greatly adds to the cost of manufacturing memory controllers and memory components.

Fully Buffered Dual In-Line Memory Modules (FB-DIMMs) partially address some of the limitations discussed above. Point-to-point connections from the memory controller to an Advanced Memory Buffer (AMB) replace the multi-drop connections. A serial interface from the memory controller to the AMB reduces pin count on the memory controller and simplifies some bus routing. Each memory component contributes its portion of the entire word width.

The FB-DIMM systems introduce their own problems, however. For example, the memory controller cannot write directly to the memory components and must first write to the AMB, which generally increases cost and design complexity. Furthermore, the AMB hinders high speed operation because the process of buffering by the AMB, followed by subsequent analysis and re-sending according to a queue, introduces latency.

Yet another issue with some existing memory systems, is that the memory controller must have a data width matching the data width of each memory component. For example, a one hundred and forty four bit memory controller is compatible with one hundred and forty four bit memory, which means that the data pin count of the memory controller matches the data pin count of each memory component. As a result, device manufacturers must obtain memory components matched to the memory controller, and a high pin count on the memory controller means a high pin count for each memory component.

SUMMARY OF THE INVENTION

In an embodiment, an apparatus includes a memory controller configured to control first and second memory components. A point-to-point data bus configured to pass data between the memory controller and the memory components may include a direct connection from each memory component to the memory controller. The point-to-point data bus can be a serial bus. In an embodiment, a daisy chained address bus configured to pass commands between the memory controller and the memory components may include a direct connection from the first memory component to the memory controller and a daisy chain connection from the first memory component to the second memory component.

In another embodiment, an apparatus includes a memory controller configured to control a plurality of daisy chained memory components connected over a daisy chained bus. The daisy chained bus includes a direct connection from the transmit interface of the memory controller to a receive interface of an initial memory component, and a daisy chain connection from a transmit interface of the initial memory component to a receive interface of a next memory component. A bus extends from a transmit interface of a last memory component directly to a receive interface of the memory controller.

DESCRIPTION OF EXAMPLE EMBODIMENTS

Several examples of the present application will now be described with reference to the accompanying drawings. Various other examples of the invention are also possible and practical. This application may be exemplified in many different forms and should not be construed as being limited to the examples set forth herein.

Figure 1:
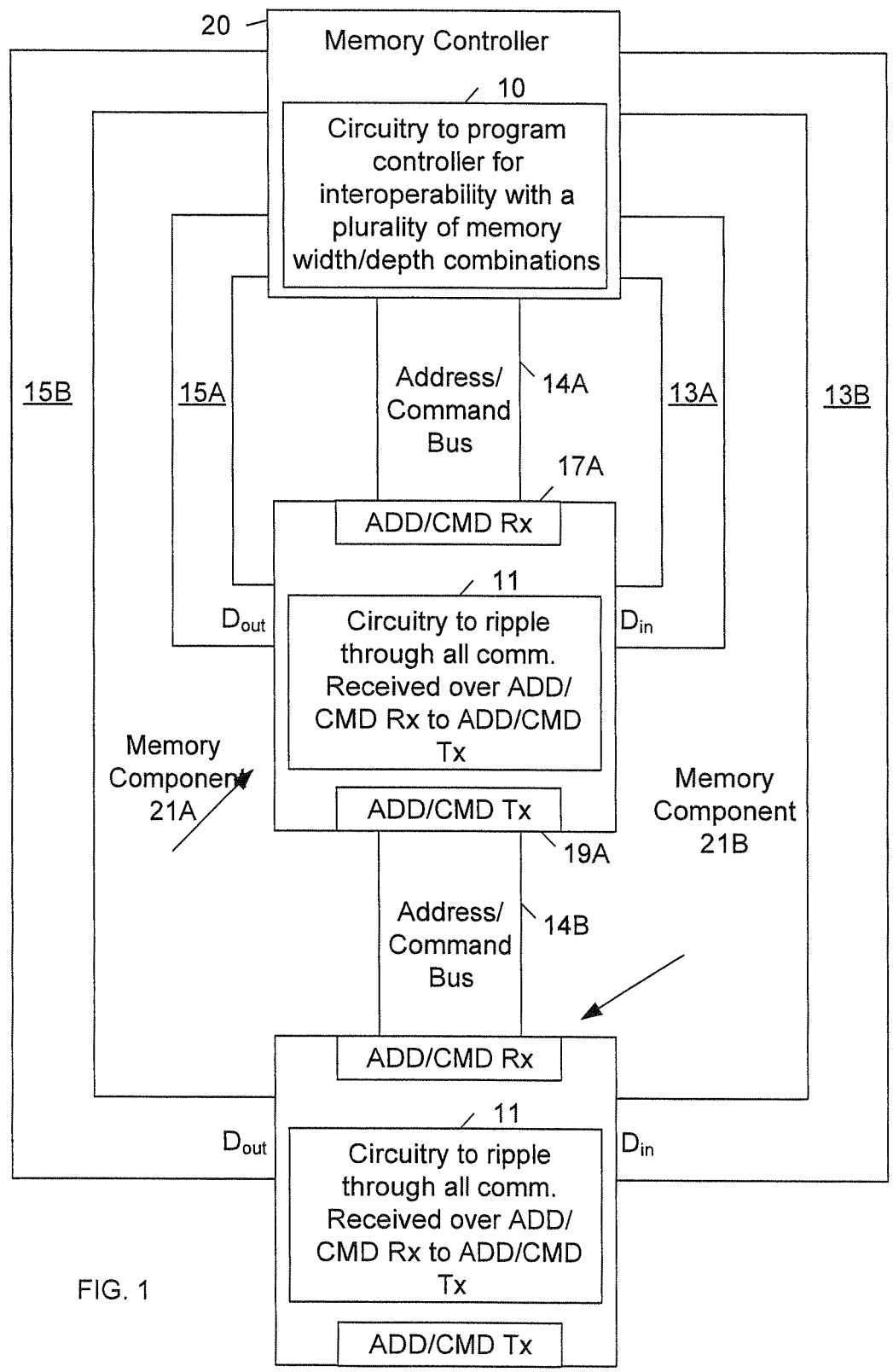
FIG. 1 illustrates a point-to-point memory architecture having memory components daisy-chained to a low latency address bus according to an embodiment.

FIG. 1 illustrates a point-to-point memory architecture having memory components daisy-chained to a low latency address bus according to an embodiment.

The system 100 includes a memory controller 20 having point-to-point connections to a plurality of memory components 21A and 21B, which can be any type of discrete integrated circuits used for storage. With respect to the address/command bus 14A-B, the memory components 21A and 21B are daisy chained to the memory controller 20, meaning that only the first memory component 21A may be directly connected to a command interface of the memory controller 20. With respect to the data bus 13A-B and 15A-B, however, each of the memory components 21A and 21B are directly connected, meaning that all of the memory components 21A and 21B may be directly connected to a data interface of the memory controller 20.

The first memory component 21A includes a circuitry 11 configured to immediately ripple through all commands received over the address bus 14A. The circuitry 11 can be an internal connection between the address/command receiver 17A and the address command transmitter 19A. Since these commands can be immediately rippled through, e.g. there is no queuing and/or buffering needed, the memory component 21B can receive re-transmitted commands over bus 14B with minimal added latency. It should be apparent that the circuitry 11 is not burdened with complex analysis to determine which commands are to be rippled through.

In the system 100, the width of the data interfaces on the memory components 21A and 21B is a fraction of a width of the data interface of the memory controller. For example, the point-to-point data buses 13A and 15A can connect to an initial portion of a data interface on the memory controller 20, while the remaining memory component 21B connects to the remaining portion of the data interface via the data buses 13B and 15B. Accordingly, the memory components 21A and 21B may have a fraction of the pin count of the memory controller 20. Also, the width of the data buses extending to and from each memory component 21A and 21B may be a fraction of the width of the computing system.

It should be appreciated that, unlike conventional systems, the system 100 provides flexibility in that the width of the memory component 21A and 21B may be different than the width of the memory controller 20. This quality allows the memory controller 20 to be configured with software or circuitry 10 that allows the controller 20 to be programmed for interoperability with a plurality of memory width/depth combinations. An example will be shown in FIG. 2 to illustrate how the circuitry 10 can be used to expand the depth of a memory system. An example will be shown in FIG. 4 to illustrate how the circuitry 10 can be used to expand the width of a memory system.

Referring still to FIG. 1, in the present system 100, the buses 13A, 13B, 15A, and 15B are serial buses. However, it should be apparent that it is both possible and practical to apply the principles described above to systems containing parallel data buses.

It should also be appreciated that memory components 21A and 21B can be architecturally identical. It should be apparent that this provides ease of configuration and ease of manufacture.

The system 100 is particularly suited to the networking environment where relatively large word widths, e.g. one hundred and forty four bits, are used. In such an environment, the reduced number of links routed to each memory component is particularly helpful. It should be apparent that, by comparison to some conventional systems the present system 100 uses 1/Nth the number of links routed to each memory component, where N is equal to the number of memory components used. Although the principles described herein are applicable in the networking environment and other environments using relatively high bit width, it is both possible and practical to apply the principles described herein to any memory systems, such as thirty two bit memory systems.

In the networking environment the memory components to be accessed are typically Static Random Access Memory (SRAM). However, it is both practical and possible to apply the principles describe herein to any type of memory including, but not limited to, DRAM, flash memory, etc.

Figure 2:
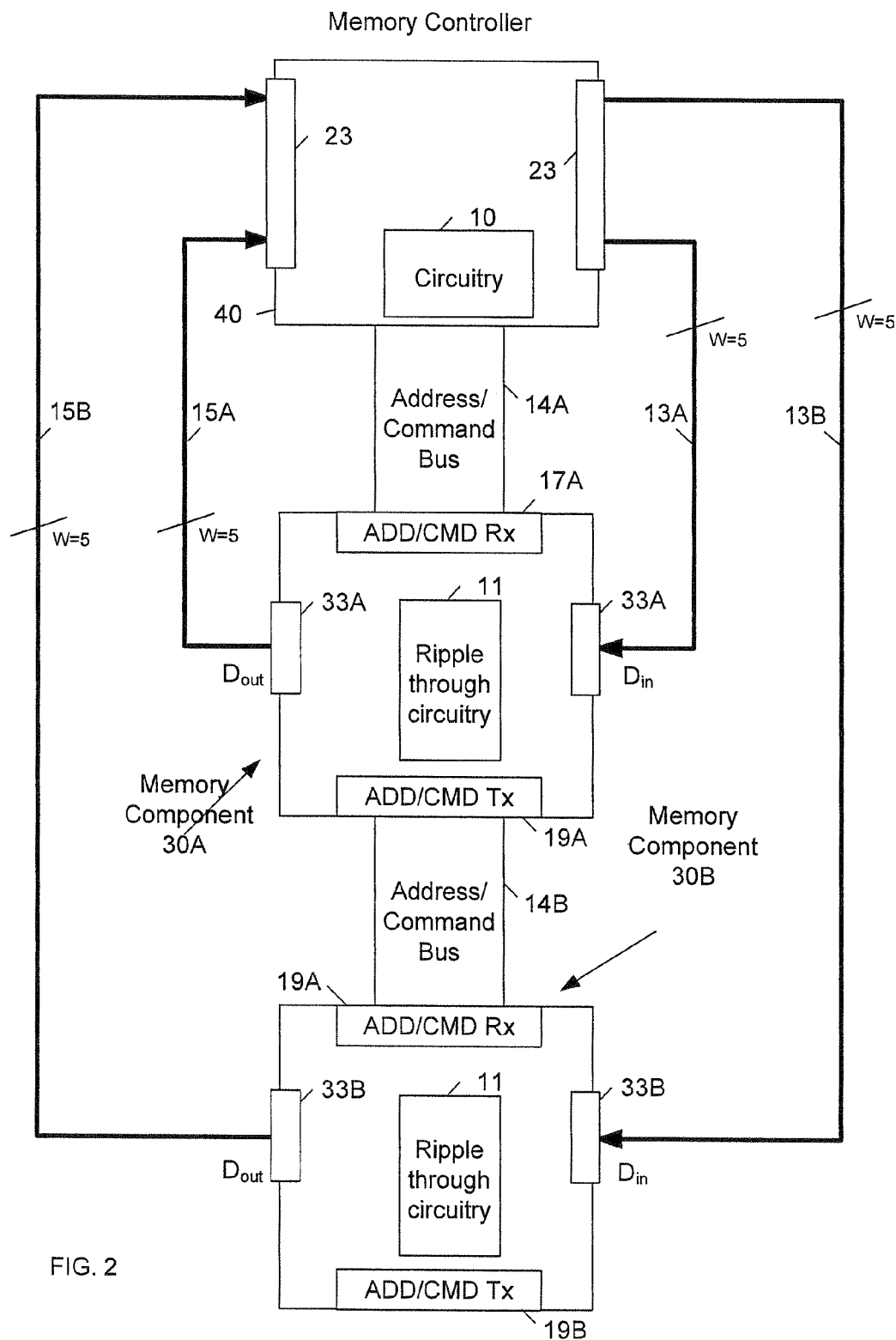
FIG. 2 illustrates memory depth expansion using the point-to-point memory architecture of FIG. 1.

FIG. 2 illustrates memory depth expansion using the point-to-point memory architecture of FIG. 1.

The example system 200 expands memory depth by operating two forty bit memory components 30A and 30B with an eighty bit memory controller 40. By way of background, memory depth refers to the number of bits available for each bit of width. The system 200 effectively doubles memory depth by accessing a word using two memory components instead of one. The following paragraphs provide an example of a write operation in the system 200.

To cause a word to be written to memory, the memory controller 40 sends the word out over the interface 23. The first forty bits of the word are sent over the bus 13A, which in the present example is a serial bus having five serial links. The second forty bits of the word are sent over a different portion of the same interface 23 and over the other bus 13B. The two halves of the word are respectively received at interfaces 33A and 33B.

The controller 40 also sends a single write communication over the address bus 14A. The single write communication provides the memory space addresses to write the word. Since the address space extends over two memory components, the addresses contained in the write communication correspond to locations in both memories.

The memory component 30A receives the write communication over the receiver 17A. The memory component 30A acts on the write communication as it corresponds to a location on the component 30A thereby writing the first half of the word to that local location.

The circuitry 11 also ripples the write communication through to the transmitter 19A for re-transmission over the bus 14B. Instead of spending latency determining which portion of the write communication corresponds to the component 30B, the circuitry 30A re-transmits the entire write communication via the transmitter 19A. The operation is similar to a loop back technique used to self test a wireless transceiver's transmitter and receiver.

The component 30B writes the remaining half of the word (received over input interface 33B) according to the write communication from the bus 14B. For ease of manufacturing and interchangeability it is possible that the memory component 30B may contain the circuitry 11 as well, although in the present example with two components there is no bus connected to the transmitter 19B.

A read command operates in a similar fashion. After receiving the read communication over the buses 14A and 14B, the memory components 30A and 30B output the requested word over the interfaces 33A and 33B.

The transmission latency associated with the data buses 13A-B and the address buses 15A-B can be different, in particular, because of latency added by rippling through the commands. For this and other reasons, a compensation technique can be used to avoid misalignment of the command and the data. For example, the memory component 30A can be configured to impose a delay on the data received over the bus 13A to align this data with the command received over the receiver 17A. The memory component 30B can impose a longer delay on the data received over the bus 13B to align this data with the command received over the address bus 14B as this command will be received later in time than the command received by the memory component 30A. This delay can be implemented using registers, First In First Out (FIFO) buffers, or any other known mechanism for imposing a delay. The delay can be programmable on each memory component depending on that memory components position along the daisy chain.

Another type of imposed delay that can be used is a delay by the memory controller 40 to ensure that data received over the buses 15A-B can be associated with the command sent over the address bus 14A. The delay applied by the memory controller 40 corresponds to the delay applied by the memory components as the memory component's delay affects the difference in time between the memory controller 40 transmitting the command and receiving back the data.

It should be apparent that the depth expansion can be performed even when the memory components have the same width as the memory controller. For example, if the memory components 30A and 30B were manufactured as eighty bit components, half of the interfaces 33A and 33B could be powered down.

It should be apparent that the circuitry 10 allows the memory controller 40 to be programmed for the above described depth expansion. Accordingly, the controller 40 can interface with, for example, an eighty bit wide memory component, two forty bit wide memory components, four twenty bit wide memory components, etc. It should be understood that the circuitry 10 can also be used to program the memory components to use a reduced number of inputs and outputs, thus increasing the memory depth by the same ratio, e.g. the depth at forty bits will be 2× the depth at eight bits and the depth at twenty bits will be 4× the depth at eighty bits. Depending on the configuration, the system 200 will have different memory depth.

It should be apparent that the system 200 can be implemented by updating existing memory controllers with software configured for the above described functionality. The software may account for a latency difference. Otherwise existing controllers do not specify any hardware change to receive words from two or more components.

Figure 3:
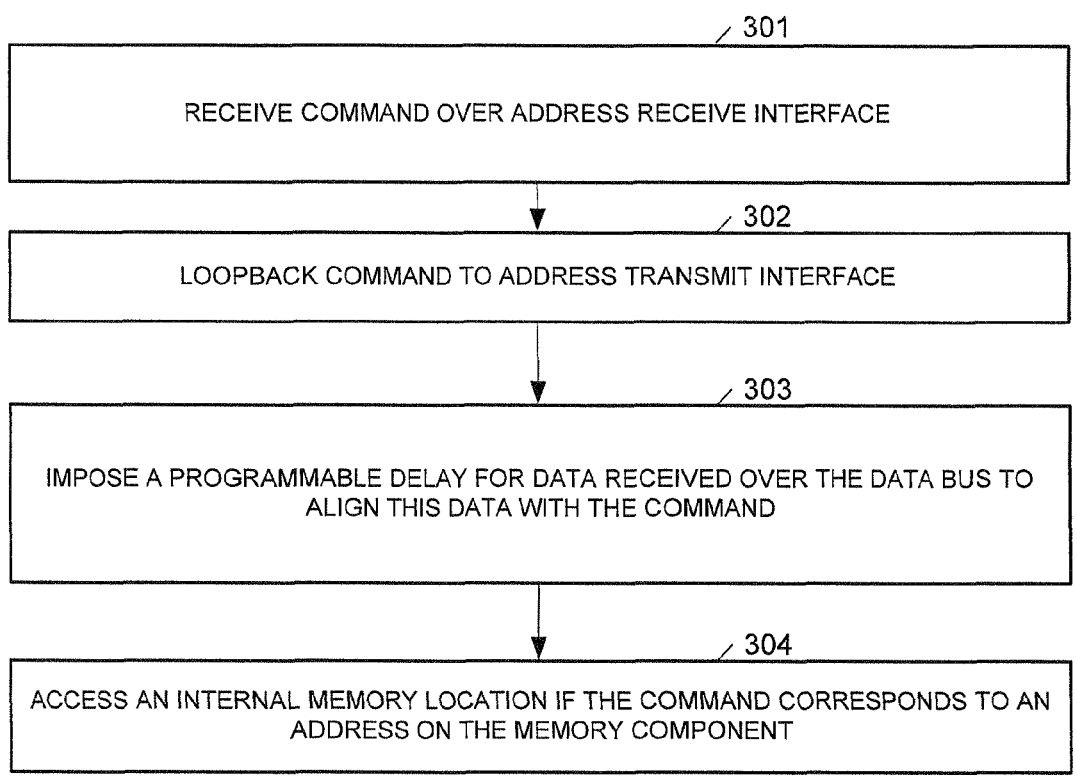
FIG. 3 illustrates a process for using the initial memory component of FIG. 1.

FIG. 3 illustrates a process for using the initial memory component of FIG. 1.

In block 301, the memory component receives a command over the address receive interface. In block 302, the memory component loops back the command to an address transmit interface.

In block 303 the memory component can impose a programmable delay to data received over the data interface. This programmable delay is to align the received data with the command received over the address receive interface. The duration of this delay is dependent on the memory component's position along the daisy chain. In block 304, the memory component accesses a memory location according to the command if the command corresponds to a local address location.

Depending on the tolerance built into the system and on other factors such as the differences in lengths of the data buses to the different memory components, operating frequency, and the total number of memory components connected in series along the address bus, block 303 may not be needed. For example, some systems tolerate misalignment of up to ten times the cycle time, e.g. ten nanoseconds in a system with a ten Gigahertz operating frequency.

The programmed amount can be set according to empirical analysis of measured latency for each memory component propagating received commands. Accordingly, counting outwards from the initial memory component, each memory component is programmed to impose a progressively larger programmable delay with the last memory component in the series programmed to impose the largest delay.

The programmable delay can also be computed by each memory component according to inputs. For example, based on an input indicating the amount of memory components connected in series along the address bus as well as an indication of the memory component's position in the series, the memory component can determine a time delay to be imposed.

Figure 4:
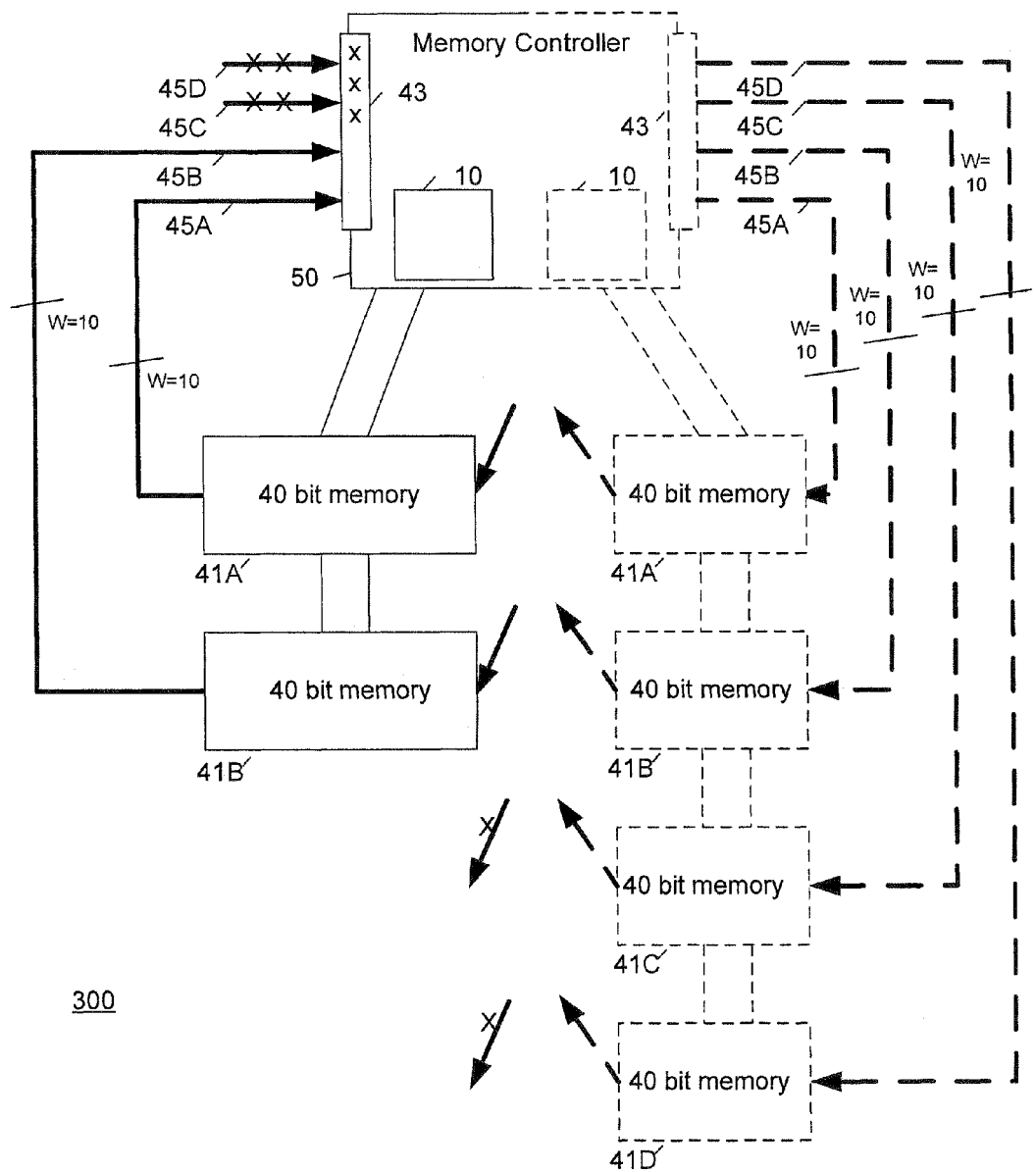
FIG. 4 illustrates memory width expansion using the point-to-point memory architecture of FIG. 1.

FIG. 4 illustrates memory width expansion using the point-to-point memory architecture of FIG. 1.

The example system 300 is used to illustrate width expansion, or width adjustment, using the circuitry 10 on the memory controller 50. In the present example, the memory controller 50 is a one hundred and sixty bit memory controller that can operate in a plurality of bit width modes, including a first eighty bit mode as indicated by the solid lines and a second one hundred and sixty bit mode as indicated by the dashed lines.

In the first mode, the system 300 operates as an eighty bit wide system. Since the controller 43 is operating with forty bit memories 41A-B, certain buses (45C-D) and interface portions of the interface 43 can be disabled for power savings as indicated by the "x" markings. It should be apparent that some of the data bus connections and part of the memory controller 50 in the first mode have been shown for ease of illustration.

In the second mode, the system 300 can operate with as a one hundred and sixty bit wide system using similar hardware. Specifically, the width may be adjusted to one hundred and sixty bits by using two additional memories (41C-D), and by powering the memory controller's entire data interface 43 and all the data buses 45A-D. It should be apparent that some of the data bus connections and part of the memory controller 50 in the second mode have been shown for ease of illustration.

Accordingly, it should be apparent that the circuitry 10 provides the capability for width adjustment. Either mode can be selected using the circuitry 10 thus allowing the same hardware to be used for different bit wide systems depending on user preference and application needs. It should be understood that there is no limitation to the amount of modes that can be provided by the circuitry 10, for example, the circuitry 10 can configure the system 300 for a third mode of forty bits with the memory component 41A utilized.

Figure 5:
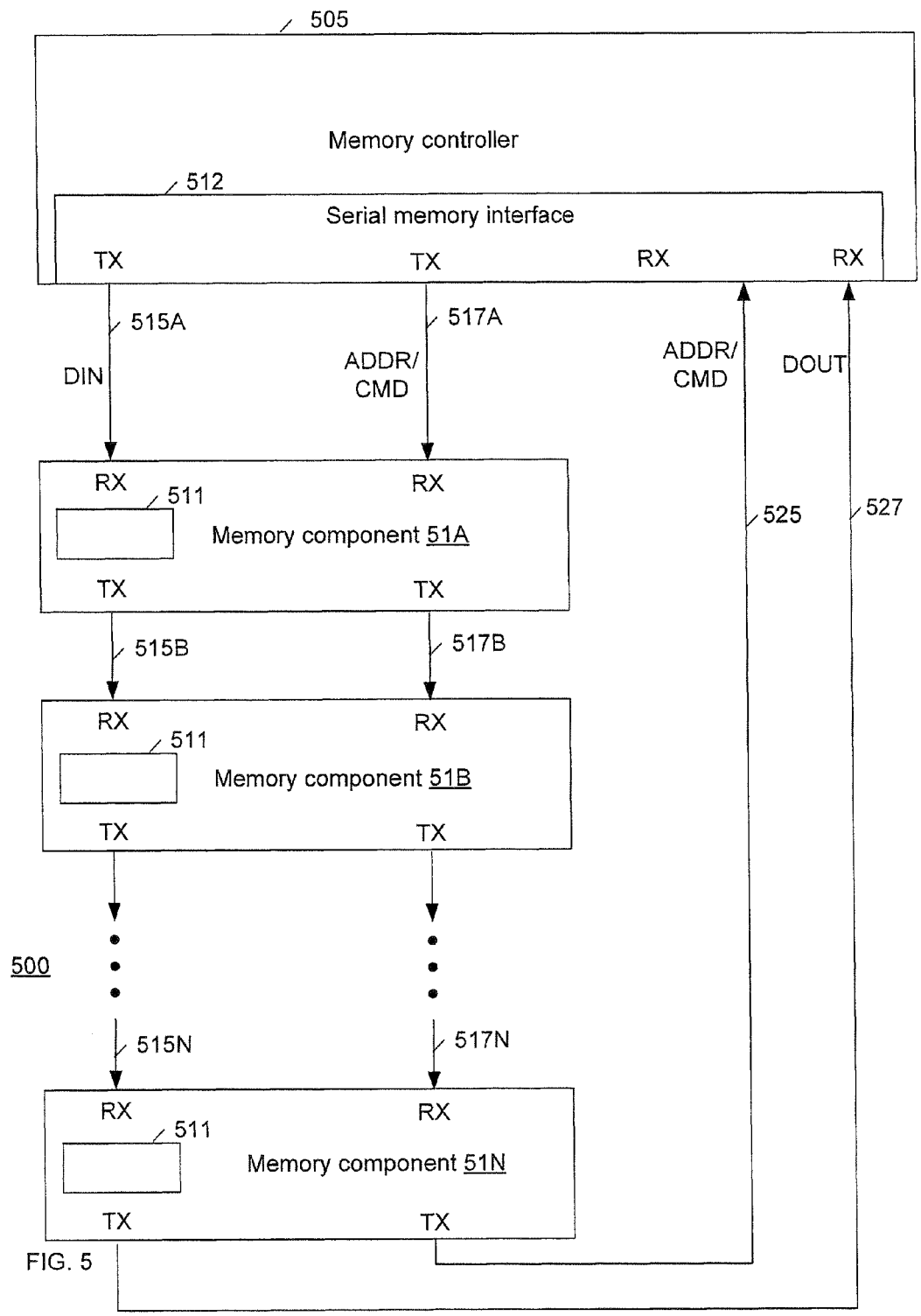
FIG. 5 illustrates a system with memory components daisy chained from the transmit interface of a memory controller.

FIG. 5 illustrates a system with memory components daisy chained from the transmit interface of a memory controller.

The system 500 includes a memory controller 505 having a connection 515A/517A from the transmit portion of the serial memory interface 512 to a memory component 51A, which can be any type of discrete integrated circuit used for storage. With respect to the transmit portion of the serial memory interface 512, the memory components 51A-51N are daisy chained to the memory controller 505, meaning that only the first memory component 51A may be directly connected to a transmit portion of the interface 512 of the memory controller 505. However, with respect to the receive portion of the serial memory interface 512, this portion has a point-to-point connection directly to a transmit interface of the last memory component 51N in the daisy chain.

The memory component 51A has the transmit portion of its data interface connected to the receive portion of the data interface of the memory component 51B. The memory component 51B has the transmit portion of its data interface connected to the receive portion of the data interface of a next memory component. The last memory component 51N has the receive portion of its data interface to a previous memory component. The transmit portion of the last memory component 51N is connected to the receive portion of the interface 512 of the memory controller 505. The width of the data interfaces on the memory components 51A-N matches a width of the data portion of the interface 512 of the memory controller.

The memory components 51A-N include circuitry 511 configured to immediately ripple through commands received over the address bus 517A. The circuitry 511 can be an internal connection between the address/command receiver of the memory component and the address command transmitter of the memory component. Since these commands can be immediately rippled through, e.g. there is no queuing and/or buffering needed, the memory component 51B can receive re-transmitted commands over bus 517B with minimal added latency.

Each memory component 51A-N has a configuration specified by, for example, a bonding option, bit setting, or other mechanism for configuring the memory components 51A-N. This configuration mechanism is used to allocate a respective portion of a memory space to each memory component 51A-N. For example, the memory component 51A is configured with an initial portion of a memory space, the memory component 51B is configured with a next portion of the memory space, and the memory component 51N is configured with a last portion of the memory space. The memory space thus extends over more than one memory component.

The first memory component 51A compares an address of a command received over connection 517A to an assigned address range. If there is a match, the first memory component 51A performs an internal access according to the received command and sends out a NOP instruction over connection 517B. The NOP instruction blocks other memory components 51B-N further down the chain from operating in response to the command. If there is no match, the circuitry 511 passes the received command over the connection 517B to the next memory component 51B. This process continues through the daisy chain (a NOP is finally sent over connection 525).

When the received command is a read on an address in a memory range of the memory component 51A, the memory component 51A looks up the data and sends it out over connection 515B to be passed through the other memory components 51B-N via connections 515B-N and 527. When the received command is a write on an address in a memory range of the memory component 51A, the memory component 51A receives data to be written over connection 515A. An acknowledgement for the write is finally sent over connections 515B-N and 527.

It should be appreciated that the system 500 provides flexibility with memory depth. Namely, the memory controller 505 has a same interface 512 regardless of the number of memory components 51A-N that are daisy chained to the transmit portion of the interface 512 of the memory controller 505. The memory width (e.g. width of the interface 512) can be maintained as depth is expanded/reduced by varying the number of memory components.

It should also be appreciated that memory components 51A-N can be architecturally identical to each other. It should be apparent that this provides ease of configuration and ease of manufacture. It should be apparent that the configuration discussed earlier can be performed after a manufacture process.

The above described configuration of the system 500 has bus routing advantages when compared to other systems. As the number of memory components in the system 500 is increased, there is very little corresponding trace added. For example, it should be apparent that each additional memory component requires only one additional data bus, rather than two additional data buses in other designs (due to the single memory controller receive data bus 527).

It should be understood that the principles described with respect to FIG. 5 can be combined with the principles described with respect to FIG. 4. In such a combined system, each of the memories 41A-41D (FIG. 4) includes at least one other memory component attached thereto. Each of the memories 41A-41D ripples through commands to the attached memory component(s) over a data bus. The transmit interface of the attached memory component is attached to the receive interface of the memory controller 50. The resulting system has both width and depth expansion. This will be discussed later in more detail with respect to FIG. 7, after continuing the discussion of the present system 500 with respect to FIG. 6.

Figure 6:
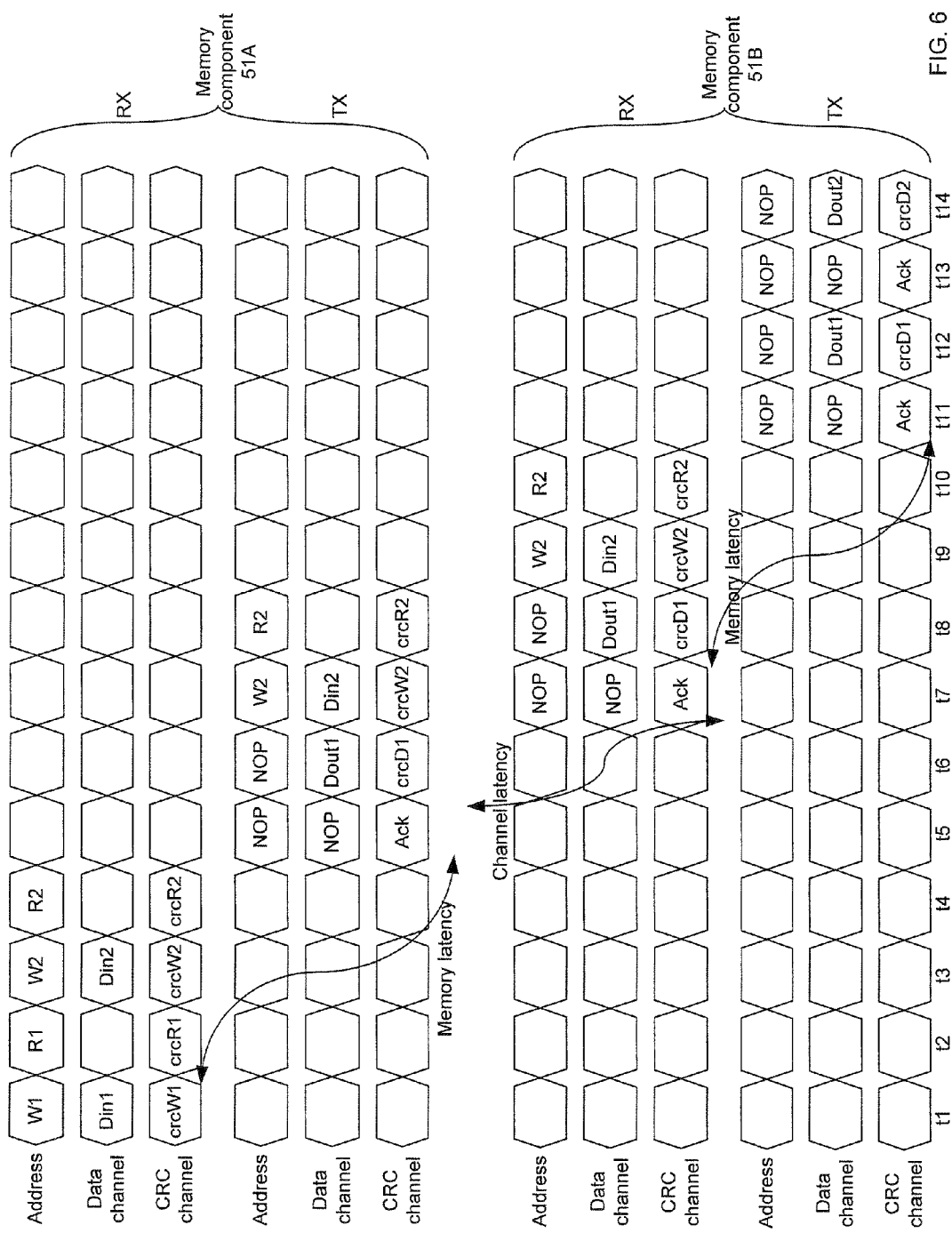
FIG. 6 is a timing diagram for memory components 51A and 51B of the system shown in FIG. 5.

FIG. 6 is a timing diagram for memory components 51A and 51B of the system shown in FIG. 5.

At a time t1, the memory component 51A receives over an address bus to the memory controller a write W1 to its assigned address range. The memory component 51A also receives data Din1 and crcW1 over respective channels of a data bus to the memory controller. The crcW1 is associated with address W1 and data Din1.

At a time t5 (accounting for memory latency associated with processing the write), the memory component 51A transmits NOP over the address bus, since the write W1 is within its address range. The memory component 51A also outputs a NOP over the data bus since there is no data output on a write. An acknowledgement can also be output for a CRC check.

At a time t7, the NOPs and the acknowledgement are received at the memory component 51B (accounting for channel latency associated with transmission over the bus). The memory component 51B passes the NOPs and the acknowledgement to a next memory component at time t11.

The timing diagram of FIG. 6 also shows the processing with a read to the memory component 51A, a write to the memory component 51B, and a read to the memory component 51B. Referring to the write to memory component 51B (W2), at time t3 the memory component 51A receives the W2 command and the data to be written. After the comparison indicates no match to the address range of the memory component 51A, at time t7 the memory component 51A passes the W2 command and the data to be written back out over the bus to be received and processed by the next memory component 51B as shown.

Some timing characteristics for the system 500 are apparent from the timing diagram of FIG. 1. For example, the system 500 maintains the same latency on the data bus as the address bus (data transmissions and address transmissions are aligned).

Also, the data channel of the data bus has 50% utilization, assuming equal numbers of reads and writes. For example, in the example timing diagram the data channel on the receive interface of the memory device 51A has two of four time slots empty (50% utilization) with two reads and two writes.

Also, the system 500 uses cycle-by-cycle CRC scheme with a CRC channel in the data bus. For example, the transmit interface of the memory component 51A sends transmissions over the CRC channel of the data bus at every one of times t5-t8. This is in contrast to some other memory systems having a data-by-data CRC check (CRCs are accumulated/delayed to align CRC transmission with data transfers or other reasons).

Figure 7:
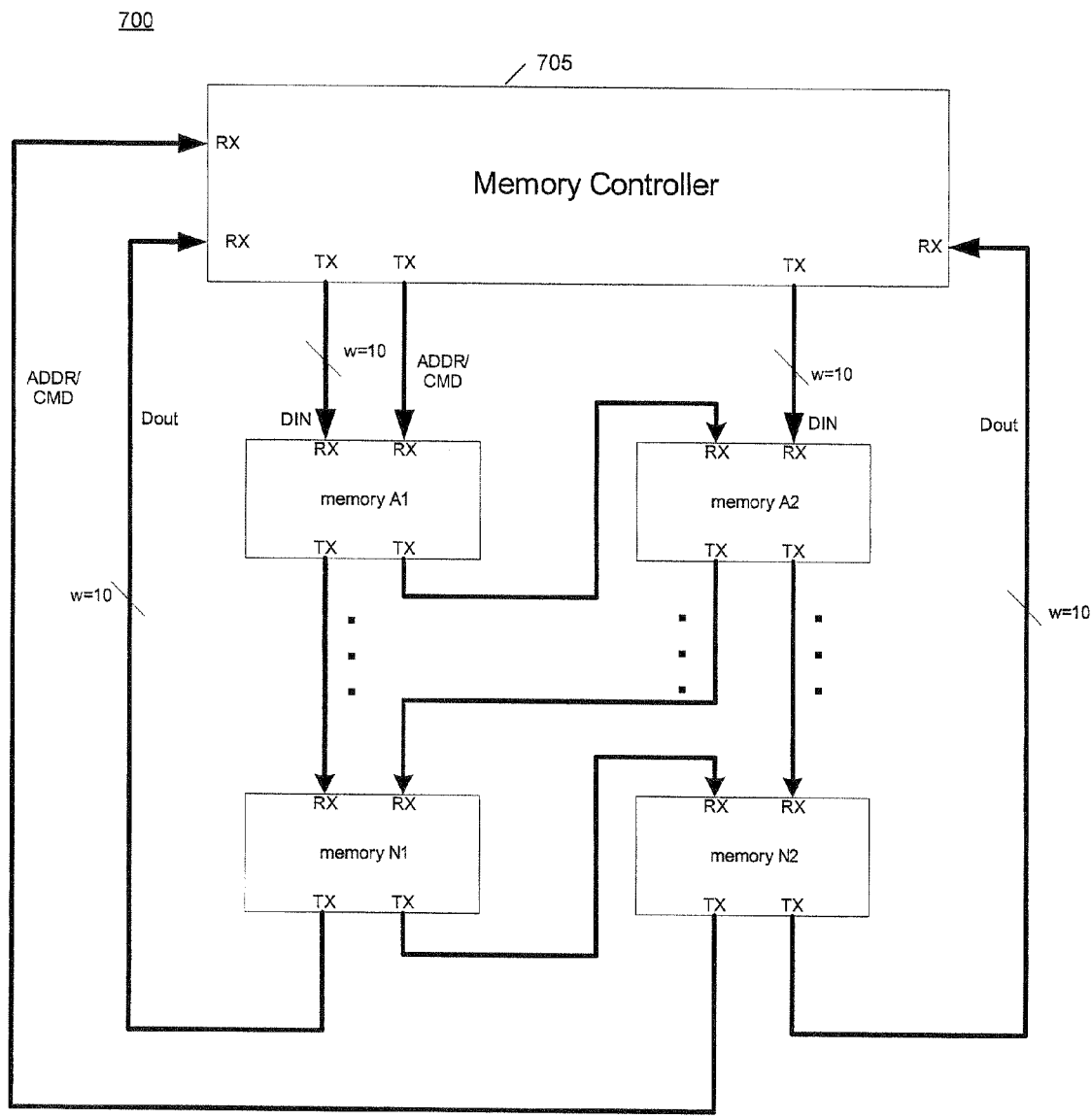
FIG. 7 illustrates a system utilizing principles described with respect to FIG. 4 for memory width expansion in combination with the principles described with respect to FIG. 5 for memory depth expansion.

FIG. 7 illustrates a system utilizing principles described with respect to FIG. 4 for memory width expansion in combination with the principles described with respect to FIG. 5 for memory depth expansion.

In the system 700, the memory controller 705 has width expansion, namely a 20 bit transmit interface is coupled to 10 bit memories A1 and A2. In other systems, there can be addition memories A3-AN similar to the description of FIG. 4. The memories A1 and A2 each have at least one memory N1 and N2 respectively coupled as shown thereto for depth expansion.

Memory A1 ripples through received commands to memory A2 as shown, similar to FIG. 4. Latency is configured in the system 700 so that the latency associated with passing a command from memory A1 to memory A2 corresponds to the latency for memory A1 to process and transmit data out of the TX interface of memory A1. This allows memory N1 to receive aligned address and data transmissions. Address control is performed similar to FIGS. 4 and 5, namely by configuring the memory controller 705 and setting the address ranges of the memory components A1, A2, N1, and N2.

Several examples have been described above with reference to the accompanying drawings. Various other examples of the invention are also possible and practical. The system may be exemplified in many different forms and should not be construed as being limited to the examples set forth above.

The figures listed above illustrate examples of the application and the operation of such examples. In the figures, the size of the boxes is not intended to represent the size of the various physical components. Where the same element appears in multiple figures, the same reference numeral is used to denote the element in the figures where it appears.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. However, there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in embodiments thereof, it should be apparent that the disclosure may be modified in arrangement and detail without departing from such principles. Modifications, equivalents and variations coming within the spirit and scope of the following claims are claimed.

What is claimed is:

1. An apparatus, comprising:
   a memory controller configured to control memory components, wherein each memory component is a discrete integrated circuit configured to store data;
   a daisy chained bus configured to pass commands and write data from the memory controller to the memory components, the daisy chained bus having a direct connection from the memory controller to an initial memory component of the memory components and a daisy chain connection from the initial memory component to a next memory component of the memory components; and
   a point-to-point bus configured to pass read data from the memory components to the memory controller, the point-to-point data bus configured to provide an individual direct connection between each of the memory components and the memory controller, the individual direct connection being configured to enable each of the memory components to directly pass read data to the memory controller.

2. The apparatus of claim 1, wherein the initial memory component further comprises:
   a receiver connected to the daisy chained bus, the receiver configured to communicate directly with the memory controller over the direct connection of the daisy chained bus;
   a transmitter connected to the point-to-point bus, the transmitter configured to communicate with the memory controller through at least the next memory component over the direct connection of the point-to-point bus; and
   circuitry configured to internally link the initial memory component receiver and the initial memory component transmitter to pass a command received via re-transmission using the transmitter.

3. The apparatus of claim 2, wherein the circuitry is configured to compare the received command to an address range of the initial memory component and pass the received command according to the comparison.

4. The apparatus of claim 1, wherein the last memory component further comprises:
   a receiver connected to the daisy chained bus, the receiver configured to communicate with the memory controller through at least the initial memory component over the direct connection of the daisy chained bus;
   a transmitter connected to the point-to-point bus, the transmitter configured to communicate directly with the memory controller over the direct connection of the point-to-point bus; and
   circuitry configured to internally link the initial memory component receiver and the initial memory component transmitter to pass data from the initial memory component via retransmission using the transmitter.

5. The apparatus of claim 1, wherein a count of active pins of a data interface of the memory controller is equal to a count of active pins of a data interface of one of the memory components.

6. The apparatus of claim 1, wherein the daisy chained bus is a serial bus.

7. The apparatus of claim 1, wherein the memory components define an address space, and wherein the initial memory component stores data of a particular range that is non-overlapping with a range of the last memory component.

8. The apparatus of claim 7, further comprising circuitry in the initial memory component, the circuitry configured to:
   compare an address included in a received command to the particular range; and
   pass the command to the next memory controller over the daisy chained bus according to the comparison.

9. The apparatus of claim 7, wherein the daisy chained bus and the point-to-point bus each have at least one channel designated for Cyclic Redundancy Check (CRC) transmissions, wherein each memory component sends or receives a CRC transmission at every processing cycle.

10. The apparatus of claim 1, wherein the memory controller has only two point-to-point connections extending there from, with one point-to-point connection extending from a transmit interface of the memory controller and the other point-to-point connection extending from a receive interface of the memory controller, and wherein the memory controller is coupled to more than two memory components.

11. A local data storage component, comprising:
- a first interface configured to directly connect to a first remote data storage component, wherein the first remote data storage component and the local data storage component are each discrete integrated circuits configured to store data;
- a second interface configured to directly connect to a second remote data storage component wherein the second remote data storage component is another discrete integrated circuit configured to store data and is different from the first remote data storage component;
- a third interface configured to directly connect the local data storage component to a memory controller using a data bus, the data bus being configured to enable the local data storage component to directly pass read data to the memory controller; and
- circuitry configured to pass a command received over the first interface to the second interface for re-transmission if the command includes an address outside a range assigned to the local data storage component.

12. The local data storage component of claim 11, wherein the local data storage component is daisy chained to the first remote storage component and receives commands from the memory controller through the first remote storage component.

13. The local data storage component of claim 11, wherein the first interface has a width equal to a width of a transmit portion of the memory controller.

14. The local data storage component of claim 11, wherein every data transmission over the second interface is aligned with a respective address transmission.

15. The local data storage component of claim 11, wherein Cyclic Redundancy Check (CRC) transmissions received over the first interface are processed on a cycle by cycle basis.

16. A local data storage component, comprising:
- a receive interface configured to directly connect to a remote data storage component wherein the remote data storage component and the local data storage component are each discrete integrated circuits configured to store data;
- a first transmit interface configured to directly connect to a second remote data storage component that is another discrete integrated circuit configured to store data;
- a second transmit interface configured to directly connect the local data storage component to a memory controller via a data bus, the data bus being configured to enable the local data storage component to directly pass read data to the memory controller; and
- circuitry configured to pass a command received over the receive interface to the transmit interface for re-transmission to the memory controller.

17. The local data storage component of claim 16, wherein the local data storage component is daisy chained to the remote data storage component and receives the command from the memory controller via retransmission by the remote data storage component.

18. The local data storage component of claim 16, wherein the receive interface has a width equal to a width of a transmit portion of the memory controller.

19. The local data storage component of claim 16, wherein every data transmission over the second transmit interface is aligned with a respective address transmission.

20. The local data storage component of claim 16, wherein Cyclic Redundancy Check (CRC) transmissions received over the receive interface are processed on a cycle by cycle basis.

* * * * *